United States Patent [19]
Sackett

[11] Patent Number: 5,297,424
[45] Date of Patent: Mar. 29, 1994

[54] TELEMETRY SYSTEM FOR TIRE PRESSURE AND TEMPERATURE SENSING

[75] Inventor: Ray A. Sackett, Monroe, Mich.

[73] Assignee: Monroe Auto Equipment Company, Monroe, Mich.

[21] Appl. No.: 490,061

[22] Filed: Mar. 7, 1990

[51] Int. Cl.[5] .............................................. B60C 73/02
[52] U.S. Cl. .................................. 73/146.5; 116/34 R
[58] Field of Search ................ 73/146.5, 146.4, 146.8, 73/146.3, 146.2; 116/34 R

[56] References Cited
U.S. PATENT DOCUMENTS 4,567,459 1/1986 Folger et al. ...................... 73/146.5
4,703,650 11/1987 Dosjoub et al. ................... 73/146.5

Primary Examiner—Donald O. Woodiel
Attorney, Agent, or Firm—Harness, Dickey & Pierce

[57] ABSTRACT

An apparatus for measuring the temperature and pressure of air in a pneumatic tire. The apparatus comprises a circuit for sensing the temperature and pressure of air in the pneumatic tire. The apparatus further comprises a circuit for transmitting a signal indicative of the temperature and pressure of air in the pneumatic tire as sensed by the circuit for sensing. The apparatus also comprises a circuit for receiving the signal from the circuit for transmitting. The signal could be used to control a vehicle suspension system.

6 Claims, 5 Drawing Sheets

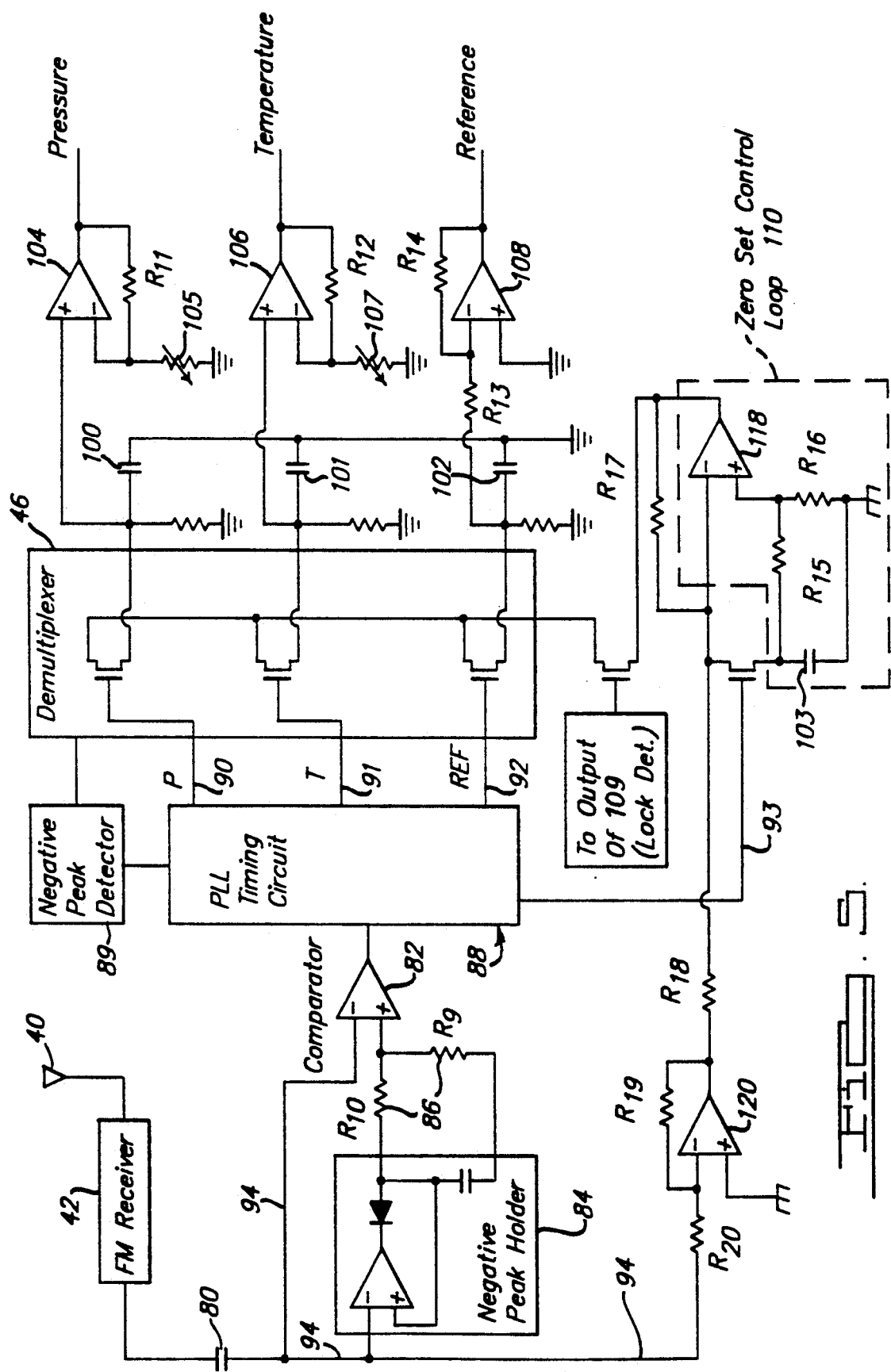

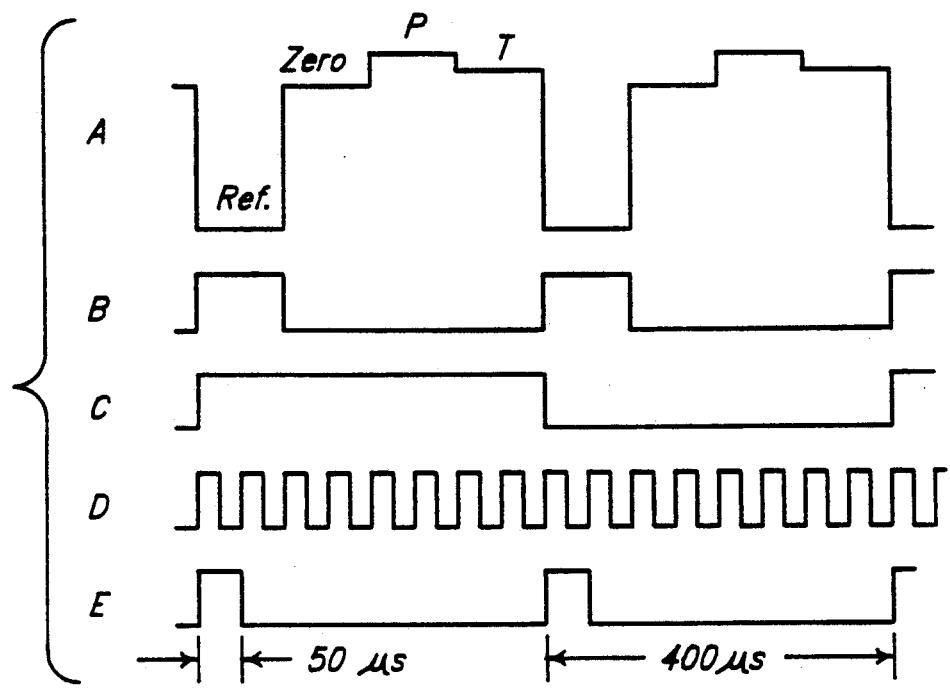
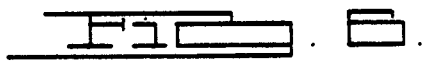
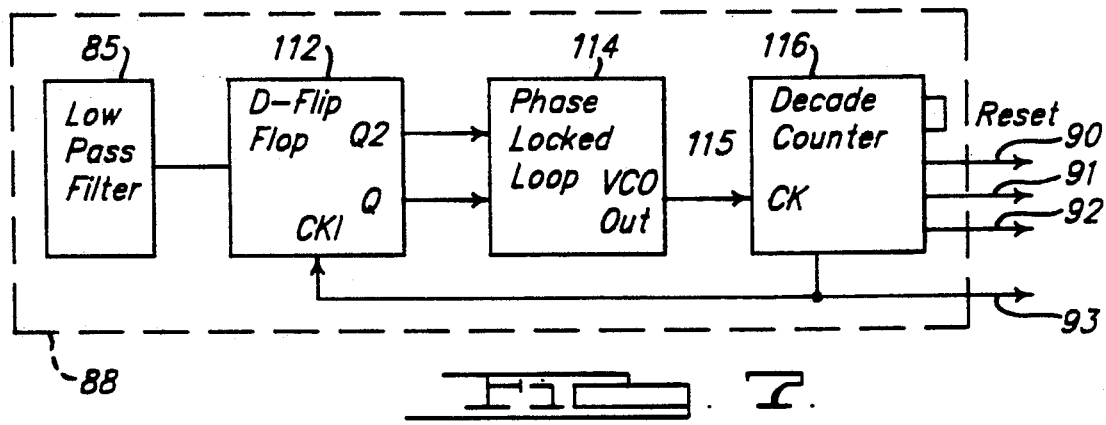
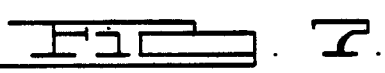
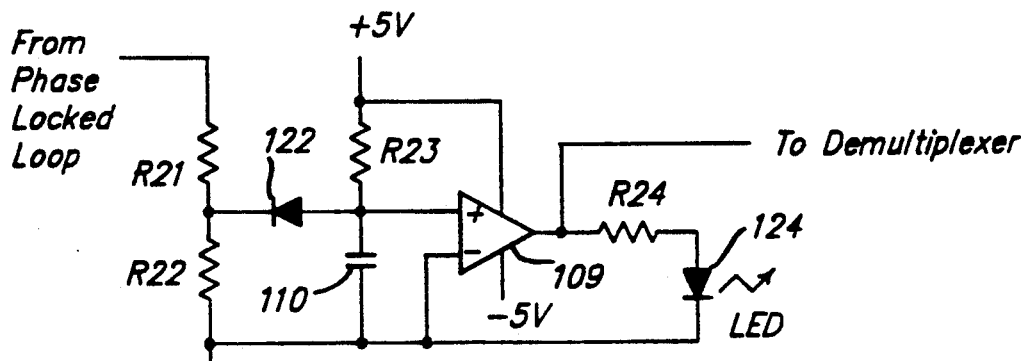
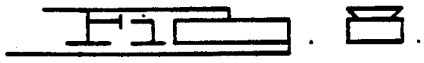

TELEMETRY SYSTEM FOR TIRE PRESSURE AND TEMPERATURE SENSING

BACKGROUND OF THE INVENTION

1. Field of the Invention

This invention pertains to the motor vehicle arts, in particular to dynamic measurement of the pressure and temperature of a motor vehicle tire as a control parameter for an operational or safety function.

2. Discussion

Most modern motor vehicles operate on suspension systems which utilize pneumatic tires. Pneumatic tires can be found in a variety of constructions, such as radial ply construction or bias ply construction, and while tires most commonly have a tubeless design, there remain types which utilize a tube to maintain air pressure. Due to the pressurized air held within a pneumatic tire, the tire provides certain advantages in ride and control of a motor vehicle. The pneumatic characteristic also has an impact on the suspension design of the vehicle.

When the vehicle is in motion, and the tire is rolling over the road surface, the tire is going through a continuous and dynamic change, particularly in its shape. In a pneumatic tire, the surface of the tire touching the road is compressed while the remaining majority portion of the tire resides in a normal state. The continual fluctuation as the tire rolls over the road caused by compression of a portion of the tire's surface, causes the tire and the air compressed within it to increase in temperature. Additionally, depending upon the maneuver that the vehicle is going through or the toughness of the surface over which the tire is rolling, the pressure of air within the tire may vary. For instance, increased load within the vehicle will increase the pressure within all of the vehicle's tires. Cornering the vehicle will increase pressure in the tires of the vehicle on the outside of the turn. Dynamic operation of the tire, which is mounted to the vehicle's suspension system, causes pressure variations, such as would occur when the tire rolls over a rough or washboard-like surface, or hits a bump. Many studies have been done by tire companies to investigate tire temperature and pressure changes in order to improve tire design characteristics.

With the advent of modern electronics, which are durable and require low power, applications of electronic systems in motor vehicles have been significantly increasing. Electronics now control most fuel management and ignition systems for engines powering motor vehicles. Automatic brake systems which assure that a wheel and tire will not skid in inclement weather or under severe braking conditions have been introduced. Electronic control of the damping elements of the vehicle suspension system, i.e., the shock absorbers, has also been designed and implemented, permitting a driver to vary the ride control of the suspension from within the driving compartment through manual selection of increased or decreased damping characteristics.

Since the ride and control of the motor vehicle is intimately dependent upon the characteristics of its suspension system, improvements in suspension system design are continually sought. Through the use of modern electronics, active control of the damping characteristics of a vehicle's suspension system has been suggested. Other parameters of suspension system design may also be dynamically controlled, such as, spring rate or roll stabilizer control.

The unfulfilled need in such an active control system is development of an accurate, but consistent and reliable means for determining control of such a suspension system. This is perhaps the primary and most important element in active suspension design. In order for a dynamically controlled suspension system in a motor vehicle to be effective, it must have suitable means by which the control required can be determined. It is believed that the invention presented herein will fulfill this need and provide an accurate, consistent, and reliable means for directing a dynamically controlled suspension system in a motor vehicle.

The present invention utilizes tire pressure and/or temperature as a source of information for a vehicle suspension system control. The following discussion of hardware is merely one example which would work but various other designs and hardware could be used to obtain the same effect.

SUMMARY OF THE INVENTION

The invention comprises a method and apparatus for directing a dynamically controlled suspension system through measurement of the pressure and temperature of air within a pneumatic tire. The foregoing circuitry and hardware is provided as merely one example which would work. Certainly, other arrangements could perform the same general function. The pressure and temperature parameters are measured in real-time mode, and transmitted to a suspension control system through a telemetry system. The telemetry system in the disclosed embodiment utilizes FM transmission means whereby four signals, a reference signal, a zero reference signal, and signals proportional to the pressure and temperature of air inside the tire, are time multiplexed for transmission.

The telemetry system comprises five parts. The first part is a sensor for measuring air pressure and air temperature within the pneumatic tire. The sensor is mounted through the rim of the wheel on which the tire is mounted. Pressure is measured by a transducer comprising strain sensitive resistors etched on a silicon diaphragm. The temperature is measured by a temperature sensitive resistor, which is strain insensitive and can be mounted on the same chip as the strain sensitive resistors.

The second part of the telemetry system is a signal multiplexer which time multiplexes the pressure and temperature signals along with a reference signal and a zero reference signal for transmission. All four signals are preferably multiplexed every 0.4 ms, providing approximately 2500 readings per second of the pressure and temperature parameters. The multiplex signal is provided to the third part of the system, which may be an FM transmitter, which transmits the multiplex signal to a receiver located apart from the wheel. The detector, multiplexer and FM transmitter are mounted on the wheel and located so as to not disturb tire balance. The multiplexer and FM transmitter parts are preferably mounted to the hub of the wheel to minimize imbalance problems due to their weight, with the sensor being positioned through the rim of the wheel into the pressurized interior of the tire. The two are connected by an electrical cable. These units may be powered by a battery or other means by which electrical power may be directed to an element mounted on a rotating wheel.

The fourth part of the telemetry system is an FM receiver for receiving the transmitted multiplex signal. Once received, the signal is directed to the demultiplexer circuitry, the fifth part of the telemetry system, which translates the multiplex signal into individual pressure and temperature signals which can be utilized for operational or safety functions, such as the control of an active suspension system.

Along with the pressure and temperature signals, a zero reference signal is provided in the multiplex signal to assure accuracy of the information provided by the pressure and time parameters. Since the amplitude of the multiplex signal may vary according to varying transmission conditions, the zero reference signal, as part of the transmitted multiplex signal, provides a parameter by which the pressure and temperature parameters can be measured since the ratios between the signals do not change. A typical timing reference signal is provided to permit demultiplexing.

The FM receiver, demultiplexer, and related operational elements may be mounted in appropriate positions in the vehicle, together or separately, and powered by the vehicle electrical power source.

BRIEF DESCRIPTION OF THE DRAWINGS

FIG. 5 is a partial circuit diagram of the reception, the demultiplexing, and the signal portions of the telemetry system according to the preferred embodiment of the present invention;

FIG. 6 depicts wave forms found at various sections of the demultiplexing system used in the telemetry system according to the preferred embodiment of the present invention;

FIG. 7 is a block diagram of a phase-locked loop timing circuit according to the preferred embodiment of the present invention;

FIG. 8 is a circuit diagram of a lock-detection circuit used as a negative peak detector according to the preferred embodiment of the present invention; and FIG. 9 is a partial circuit diagram of the battery/external power source to the receiver according to the preferred embodiment of the present invention.

DETAILED DESCRIPTION OF THE INVENTION

Figure 1:
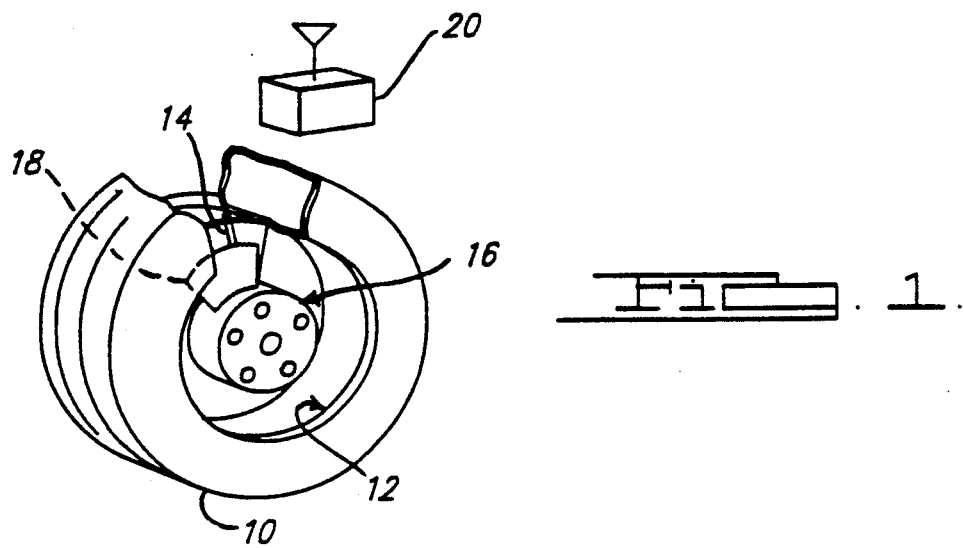
FIG. 1 is a perspective view of a wheel and tire having the multiplexer and transmitter mounted to the hub of the wheel in a first module and a pressure and temperature sensor mounted through the rim of the wheel with a second module having a demultiplexer and receiver mounted nearby.
Figure 2:
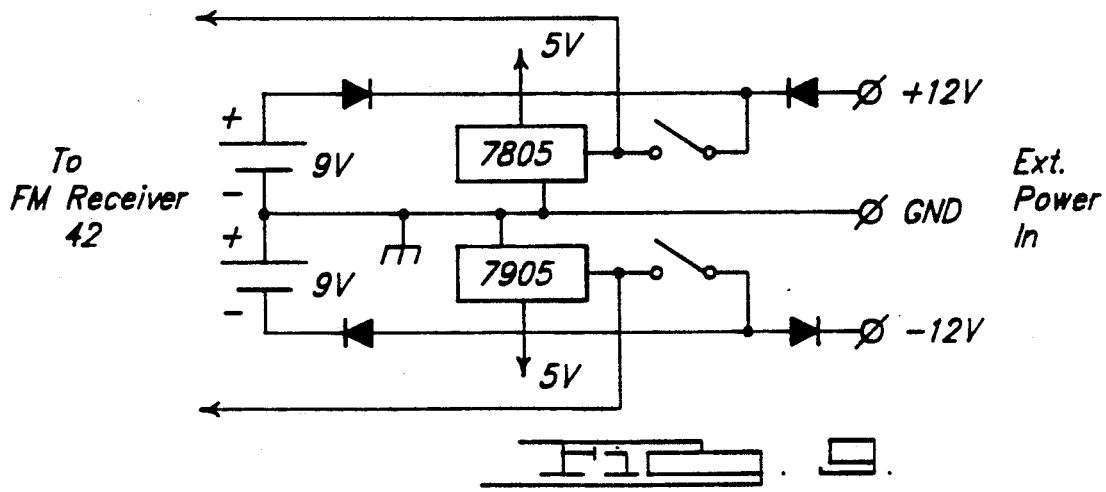
FIG. 2 is a block diagram showing the telemetry system according to the preferred embodiment of the present invention.
Figure 2:
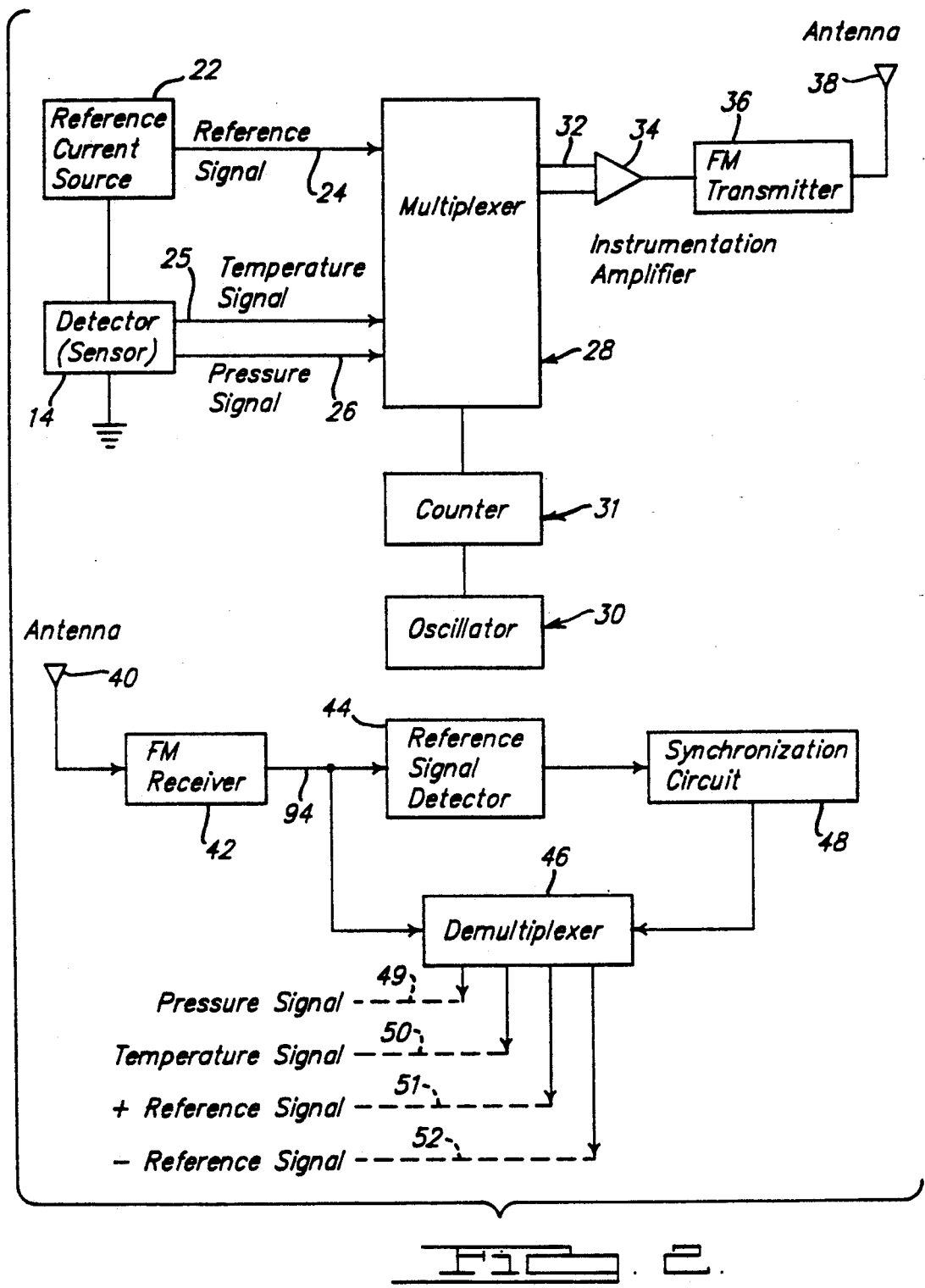

A system utilizing pressure and temperature of air within a pneumatic tire as inputs to a dynamically controlled suspension system is shown in FIGS. 1 and 2. In FIG. 1, a pneumatic tire 10 mounted on a wheel 12 is shown having a pressure and temperature sensor or transducer 14. The sensor 14 is mounted through the rim of the wheel 12 into the interior space of the tire 10 so that it may sense the pressure and temperature of air contained therein. The sensor 14 is electrically connected through cable to a first electronic module 18 mounted to the hub of the wheel 16 and centered about the axis so that its weight will not effect wheel balance when the wheel 12 is rotated. The module 18 contains part of a telemetry system including circuitry for multiplexing pressure and temperature signals obtained from the sensor 14, means for transmitting the multiplexed or composite signal from the module 18 and means for providing electrical power to the electrical components and the sensor 14.

The means for powering these components may be a small battery, or any other means by which electrical power can be supplied to the module 18 while the tire 10 and wheel 12 are rotating. For example, the means for powering may be inductive means, fiber optic means, or rotary electrical connectors to connect an electrical power source thereto. In the preferred embodiment, the output connectors are BNC.

A second electronic module 20 is mounted on the vehicle near the location of the wheel and tire, such that it is in telemetric communication with the first module 18 to receive data signals emitted from the first electronic module 18 by the signal transmission means. The second module 20 contains another part of the telemetry system including means for receiving the telemetric transmissions from the first module, and may contain means for demultiplexing the composite signal and providing individual data signals for pressure and temperature. Alternatively, demultiplexing of the composite signal may be accomplished in a third electronic module or elsewhere in the vehicle if another location is deemed more convenient by providing appropriate electrical interconnection.

The telemetry system provided in the modules 18 and 20 can be described with reference to the block diagram of FIG. 2. The sensor 14 is driven by a current source 22 contained in the first module 18. The current source 22 provides power to the sensor 14, and provides a reference signal 24 to a multiplexer 28 also contained in the first module 18. A multiplexer 28 also receives a temperature signal 25 and a pressure signal 26 from the sensor 14. An oscillator 30 and a counter 31 are connected serially to the multiplexer 28 to provide the timing function necessary for the multiplexer 28 to multiplex the signals 24-26 into a composite signal 32 which is produced by the multiplexer 28.

The composite signal 32 is applied through an instrumentation amplifier 34 to transmission means, such as an FM radio transmitter 36 which transmits the composite signal 32 as a frequency modulated radio frequency signal through the antenna 38. The transmitter 36 and a cooperating receiver 42 could be tuned to a fixed frequency. A transmitter 36 of 90.00 Mhz has been found to be not as sensitive to metal interference. The antenna 38 may be enclosed in a transmitter 36 box.

The radio frequency signal from the antenna 38 is received by a cooperating receiving means, such as a FM receiver 42, in the second module 20. The components of the second module 20 are shown in the lower portion of FIG. 2. The antenna 40 receives the frequency modulated radio frequency signal for the RM receiver 42 which embodies the composite signal 32. The FM receiver 42 provides an electrical signal, which is identified as composite signal 94 and has the same wave form as signal 32, to a reference signal detector 44 and a demultiplexer 46. The reference signal detector 44 is an electronic component which identifies a select wave form in the composite signal 94 as the reference signal which is generated over a select time increment of the composite signal by the multiplexer 28.

When the select wave form is identified in the composite signal 94 as the reference portion of the signal, a pulse is generated by the reference signal detector 44 and provided to synchronization circuitry 48 to indicate that the reference signal has occurred. The synchronization circuit 48 then provides a series of signals to the demultiplexer 46 permitting the demultiplexer 46 to identify various portions of the composite signal 94 which have the information of temperature, pressure, zero base line, and reference and decode the composite signal 94 to provide individual output signals 49–52 having the desired information about the select parameter, as identified. The composite signal 94 is directly applied to the demultiplexer 46 so that when synchronization circuitry 48 instructs the demultiplexer 46 to look at a portion of the composite signal 94 dependent upon its time position from the reference signal, the demultiplexer 46 can select the appropriate portion of the composite signal 94 and provide the signal value at the appropriate output line 49–52.

The wave form of the composite signal 32, 94 is shown in FIG. 6A. The composite signal 32, 94 comprises four portions. First, there is a reference pulse which is a negative voltage level over a select period of time. Immediately following the reference pulse, a zero reference voltage pulse will be generated for the same period of time as the reference pulse. Then immediately following the zero reference pulse, voltage pulses indicating the pressure and temperature of the air inside the tire are serially forthcoming, which provide a value for these parameters relative to the zero pulse. In other words, the differential voltage between the pressure portion of the signal and the zero reference portion or the temperature portion of the signal and the zero reference portion, will be the parameter value for each of these, respectively.

Figure 3:
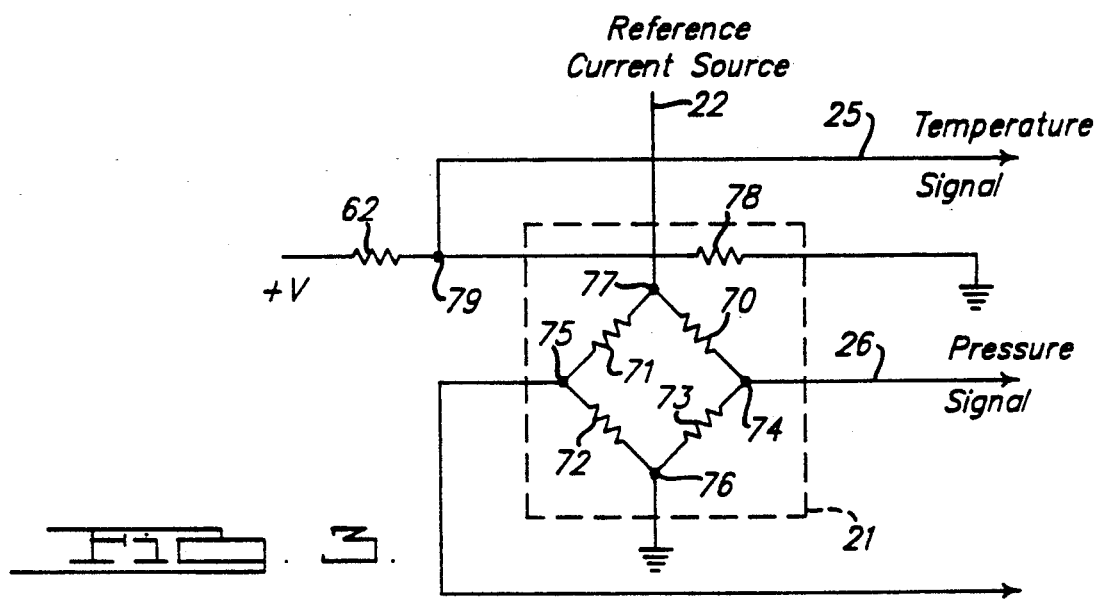
FIG. 3 is a circuit diagram of the pressure and temperature sensor utilized with the telemetry system according to the preferred embodiment of the present invention.

The circuit of the sensor 14 is shown in FIG. 3. The sensor 14 comprises a Wheatstone bridge having four connected resistors 70–73 which are strain sensitive and formed by an etching method on a silicone diaphragm. As the pressure changes within the tire, the deflection of the diaphragm changes the resistance values of resistors 70–73, which effects the voltage supplied at opposing junctions 74 and 75 of the bridge circuit. The junction 76 of the bridge circuit is grounded, while the junction 77 of the bridge circuit is driven by a current source, i.e., current source 22, providing a constant reference current thereto. The signal lines connected to the junctions 74 and 75 of the bridge circuit conduct the pressure signal 26 to the multiplexer 28. In the preferred embodiment, a laser trimmed thick film resistor network found on a substrate is utilized with respect to the output lines for pressure signal 26 to minimize temperature error in the pressure signal (not shown).

The portion of the sensor 14 which generates a temperature signal 25 comprises a temperature sensitive resistor 78, which is strain insensitive. The resistor 78 has one lead grounded, and the other lead directed toward a junction 79. On the opposing side of the junction 79 is another resistor 62 to which power is applied, as indicated by the +V. The temperature signal 25 is tapped from junction 79 which forms a half-bridge between the resistors 62, 78 so that, as the resistance of temperature resistor 78 varies with changes in temperature, voltage of temperature signal 25 will also vary proportionally.

Figure 4:
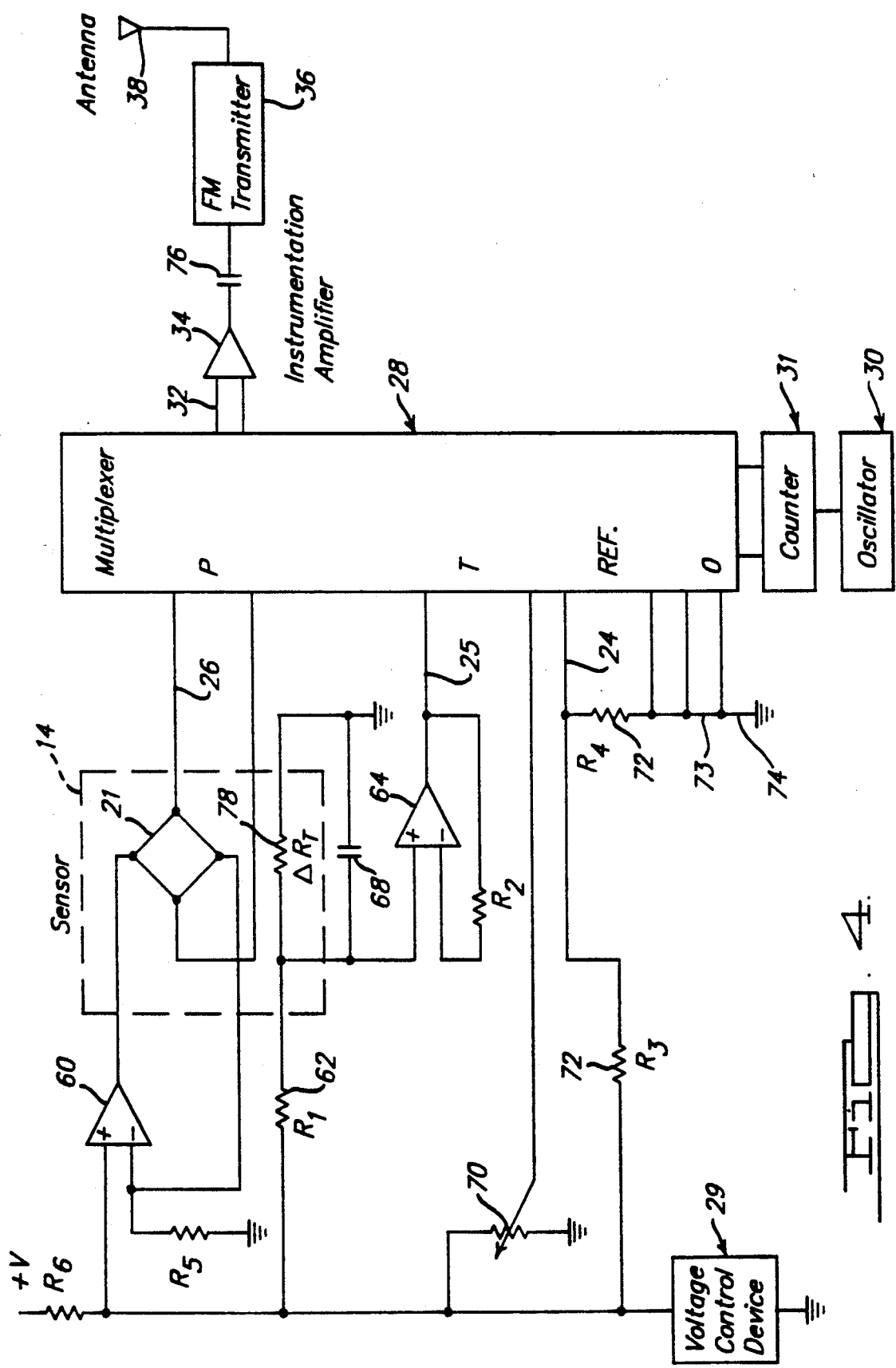
FIG. 4 is a partial circuit diagram of the sensing, multiplexing, and transmission portion of the telemetry system according to the preferred embodiment of the present invention.

An embodiment of the electronic circuitry for the detector and first module 18 is shown in FIG. 4. The pressure and temperature sensor 14, as described above, is shown having a pressure transducer portion comprising four strain sensitive resistors 70–73 etched on a silicone diaphragm which forms a bridge circuit 21 to measure pressure, and additionally a temperature transducer portion comprising a temperature sensitive resistance element 78 which varies resistance in response to the temperature to which it is exposed. The pressure measuring portion of sensor 14 is driven by a current source, generally denoted as 60, which may be an operational amplifier configured as a current source. The current source 60 provides a constant current supply to one junction of the pressure sensing bridge circuit 21. Preferably the current source 60 provides 1.24 ma of current to the pressure transducer. The differential output voltage of the signal lines from the pressure transducer provides the pressure signal 26 sent to the multiplexer 28.

The temperature signal 25 is generated by the temperature sensitive resistor 78 in the sensor 14 and another resistor 62 forming a half-bridge circuit. The signal from the half-bridge circuit is applied to an operational amplifier 64. The operational amplifier 64 is configured as a voltage follower and acts as a buffer for the temperature signal 25 between sensor 14 and multiplexer 28. Noise is reduced and response time improved by placing a capacitor 68 in parallel with the temperature sensitive resistor 78, which may have a value of 1 uf. Temperature signal 25 may be attenuated through a variable resistor 70 to compensate for variations in the temperature sensitive resistance element from sensor to sensor.

The reference signal 24 is generated through resistor network 72. A voltage is applied through a resistor network 72 and the resulting steady state reference signal 24 applied to the select channel. In the circuit shown, the applied voltage is preferably 1.24 volts and the voltage of the reference signal a constant 0.502 volts. As discussed, a zero reference signal 73 is provided for comparison with the pressure signal 26 and temperature signal 25 to obtain an absolute value for these parameters. The level of the zero reference signal 73 is obtained by connecting a channel of the multiplexer 28 to ground, shown at 74.

Voltage is applied to the various circuit elements shown in FIG. 4 by a voltage supply, generally shown as +V, which is applied through a resistor. The voltage supply utilizes a semiconductor voltage control device 29 connected in parallel with the circuit elements to stabilize applied voltage at a select value. The voltage preferred in the circuit shown is 1.24 volts. An example of a semiconductor voltage control device 29 would be a zener diode, type LM185, which is generally available. Such a device conducts current if the voltage applied is above the select value and ceases conduction when the voltage is at or below such value, thereby maintaining a stable voltage power source.

The multiplexer 28 may be one of many available which can provide the multiplex or composite signal 32 having a wave form as depicted in FIG. 6A from the applied input signals 24–26 and 73. An example would be a multiplexer type CD4052 manufactured by a number of companies, such as National Semiconductor Company, Inc., which has the signals 24–26 and 73 applied as shown. Location of the various signals 24–26 and 73 would be as follows for a CD4052 multiplexer:

| Signal | Pin No. |
|---|---|
| pressure | 2, 15 |
| temperature | |
| from op amp | 11 |
| to var. resist. | 4 |
| reference | |
| + voltage | 1 |
| ground | 12 |
| zero reference | 14, 5 |

A clocking function is provided for the multiplexer 28 by the oscillator 30 which provides a signal to the counter 31, which in turn provides a flip-flop type signal to the multiplexer 28. Preferably the oscillator 30 operates at 10.3 kHz. The flip-flop signal permits the multiplexer 28 to synchronize signal selection and form the composite signal 32 at its output. The counter 31 is necessary since the described multiplexer 28 switches four channels to one output, thus a four state synchronizing signal is necessary in binary logic.

The output signal 32 of the multiplexer 28 is applied through an instrumentation amplifier 34 to an FM transmitter 36 as described above. The FM transmitter generates a radio frequency signal through the antenna 38 which can be transmitted to a receiving unit 42. The FM transmitter 36 is coupled to an instrumentation amplifier 34 through a decoupling capacitor 76 for insulation and noise suppression. The amplifiers 60, 64 and 34 may be of a type generally known as an LT1014 which are generally available. The resistance values for the resistors in the circuit shown in FIG. 2 may be valued according to the following chart:

| R1 | 4700 ohms |
|---|---|
| R2 | 10k ohms |
| R3 | 100k ohms |
| R4 | 68k ohms |
| R5 | 1k ohms |
| R6 | 10k ohms |

An example of a circuit embodying the elements of the second module 20 is described with reference to FIG. 2, and shown in FIG. 5. The radio frequency signal generated by FM transmitter 36 through antenna 38 is received by FM receiver 42 through the antenna 40. The signal is applied to the reference signal and demultiplexer circuitry, 44 and 46 respectively, through a decoupling capacitor 80 as composite signal 94 and applied to a comparator 82, negative peak holder 84, and demultiplexer 46. The composite signal 94 possesses a reference signal portion which provides timing for the demultiplexer 46 and a zero reference portion which provides a baseline against which the pressure and temperature signals may be referenced to determine their relative value. Since the composite signal 94 contains all the information generated by the sensor 14 and also includes the timing and reference data, one needs to distinguish one portion of the signal from others to identify which portion is pressure data, which is temperature data, which is reference data, etc. To accomplish this, one needs to count or demultiplex the composite signal 94 at the same frequency as the data was multiplexed into the composite signal 32. Further, one needs to determine where the signal housing begins, i.e., where the information or data sequence starts in the signal. Since all one has is the composite signal 94 to obtain this information, the timing and data sequence initiation must be derived from the same composite signal 94. This is accomplished by the comparator 82.

The comparator 82 generates a signal at its output which has a frequency equal to the reference signal portion of the composite signal 94, and which has a pulse width equal to the reference signal portion. The reference signal portion of the composite signal 94 can be identified in FIG. 6A where it is marked by the initials REF. As shown in FIG. 6, the reference signal has the lowest voltage value in the composite signal 94 which is a substantial difference from the information bearing portion of the signal, and thus is easily identified. With the composite signal 94 applied to one input of the comparator 82, a second input to the comparator 82 is applied which identifies the time at which the lowermost peak in the composite signal 94 is received. Reception of the reference signal portion causes the comparator 82 to generate an output signal having a pulse width equal to the period during which the lowermost signal, the reference signal, is being received. Since the comparator 82 is triggered by the lowermost peak in the composite signal 94, and this peak in the composite signal 94 immediately precedes the other informational portions of the composite signal 94 in serial order, the output signal of comparator 82 shows when the information sequence in the composite signal 94 begins, and provides a signal which has a frequency which is $\frac{1}{4}$ of the multiplexer 28 frequency. The comparator 82 signal can thus be used to provide timing for demultiplexing the composite signal 94.

The signal provided to the positive input of the comparator 82 provides a lowermost threshold against which the composite signal 94 can be compared to identify the reference signal. This is accomplished when the reference signal portion, being of a lowermost peak, breaks through the threshold level. The threshold signal level can be provided by applying a fixed threshold voltage to the positive input of the comparator 82 and comparing the composite signal 94 applied to the other input of the comparator 82 to the threshold signal voltage.

In a dynamic system, however, and in particular in a telemetry type system in which radio frequency transmission is utilized, the composite signal 94 may be affected or changed as a whole due to surrounding interference, transmission conditions or system parameters. For instance, the signal as a whole may be changed in gain. A better way to provide a threshold signal against which the composite signal 94 can be compared is to utilize a negative peak holder, shown as 84, to analyze the composite signal 94 and provide the threshold voltage needed for input to the comparator 82.

The wave form that comes out of the receiver 42 has the shape shown in FIG. 6A. The negative peak is held by the negative peak holder 84 to generate a threshold voltage equal to 0.65 times that peak. The holder 84 then tracks the reference signal voltage. Since the voltage output from the negative peak holder 84 is derived from the composite signal 94, i.e., the reference signal portion, it always provides an accurate measure against which to compare the composite signal 94 to determine when the reference signal is generated. Preferably, the negative peak holder 84 generates a signal having a voltage which can be attenuated to accurately control the threshold signal voltage level which is input to the comparator 82. This is shown by resistor network 86. The threshold voltage levels generated by the negative peak holder 84 and resistor network 86 is preferably set at a level that is just greater than the negative voltage level of the reference signal, so that it can be easily determined when the reference signal breaks through the threshold voltage to trigger the comparator 82 and confidence is maintained that no other portion of the composite signal 94 caused the breakthrough. In other words, it is preferred that the comparator 82 is triggered at a voltage that is just a little higher than the voltage level of the reference signal.

Since the signal generated by the comparator 82 possesses a frequency equal to the frequency of the reference portion of the composite signal 94 and has a pulse width equal to that of the reference signal portion, one can utilize the output of the comparator 82 to determine when other portions of the composite signal 94 are being received, i.e., the pressure and temperature data portions. Timing for other portions of the composite signal 94 can be determined from the frequency or the pulse width of the comparator 82 output. This output should be equal in frequency and pulse width to that of the reference signal, and since the other portions of the composite signal 94 immediately follow the reference signal in sequential order and have equal pulse widths, they can also be identified.

Once the signal from the comparator 82 has been obtained, it is necessary to generate timing signals for the pressure, temperature, and zero reference portions of the composite signal 94 to identify those portions of the signal. These other portions of the composite signal 94 have the same frequency though are shifted in time. Timing signal generation is accomplished by a phase locked loop ("PLL") timing circuit 88 to which the output signal of the comparator 82 is applied. The PLL timing circuit 88 generates four sampling signals 90-93 to identify the specific portions of the composite signal 94 having reference, zero reference, pressure and temperature information respectively. Sampling signals 90-93 are individually generated each at a time when the related portions of the composite signal 94 is available for sampling. An electronic switch may be placed before the reference, pressure and temperature signals are sampled. The switch could be on only when the receiver 42 is locked to the transmitter signal 36 thereby preventing "garbage" on the outputs when the receiver 42 is temporarily out of lock. Since it is desired to sample or measure portions of the composite signal 94 while they are accurate and stable, each of the sampling signals 90-93 has a pulse duration that is shorter in time than the related signal portion of the composite signal 94. Thus, the sampling signals 90-93 generated by the timing circuit 88 have the same frequency as the reference signal portion of the composite signal 94, but are somewhat narrower in pulse width. This determines a sampling period for each of the segments of the composite signal 94 less the pulse widths period of that composite signal 94 portion, which is done to assure that state change and transient response interference between the serial portions of the composite signal 94 do not interfere with one another during sampling. A negative peak detector 89 is also provided as shown in FIG. 5. A circuit for the detector 89 is shown in FIG. 8. The detector 89 uses a signal from the phase locked loop timing circuit 88 which goes negative when it does not recognize the correct signal anymore.

The timing circuit 88 obtains a shorter duration pulse width for the sampling signals 90-93 by generating a timing signal having a frequency eight times the frequency of the reference signal through use of a phase locked loop device 114. This timing signal is then applied to a divide-by-eight decade counter 116 which generates the sampling signals 90-93 with a pulse width shorter than that of a reference signal, which can be for instance one half the reference signal pulse width. The wave form of a sampling signal is shown in FIG. 6E which can be compared to the comparator 82 output signal in FIG. 6B having the reference signal pulse width, to show the differing relationships in pulse widths.

The composite signal 94 is provided to a demultiplexer 46 through the comparator 82 and phase locked loop circuit 88. The composite signal 94 is distributed through the demultiplexer 46 into individual outputs each having a capacitor and gain amplifier. The demultiplexer 46 operates in response to a sampling signal 90-92 to open a gate passing the composite signal 94 being received at that moment to a sample and hold capacitor 100-102. Thus, when a sampling signal is generated indicating that pressure information is being provided by the composite signal 94, the composite signal 94 is passed through the demultiplexer 46 to a sample and hold capacitor 100 to provide a charge thereon proportional to the signal value relating to pressure. Identically the demultiplexer 46 responds to each of the sampling signals 90-92 to decode the composite signal 94.

The sample and hold capacitors 100, 101 and 102 are each connected to a gain amplifier 104, 106 and 108, respectively, which buffer the capacitors 100-102 and maintain a high impedance on their input side to assure the capacitors 100-102 will not too easily discharge, and thus maintain the signal which they are provided. Each gain amplifier 104 and 106 is provided with a variable gain element 105 and 107 respectively, such as a variable resistor, so that each may be individually adjusted to compensate for variances in system parameters, and in particular, variances in sensor 14. Once the demultiplexer 46 has received a sampling signal 90-92 and stored a signal level on a related capacitor 100-102, for a select channel, the signal level is maintained until the next sampling signal for that channel is received. Thus, continuous information about the pressure and temperature is provided at the telemetry system output.

In order to assure that the signal for the pressure and temperature parameters produced by the demultiplexer 46 is an accurate indication of that parameter, a zero set control loop 110 with operational amplifier 118 is utilized to base the pressure and temperature signals 90, 91 on the zero reference signal 93 provided in the composite signal 94. The zero set control loop is a part of an auto-zero feedback loop having resistor networks and another operational amplifier 120. The auto-zero feedback loop does not incorporate a high-gain feedback loop that could potentially cause oscillations.

The zero set control loop 110 establishes an accurate value for the pressure and temperature signals 90, 91 by differential measurement with the zero reference signal 93. This is necessary since the composite signal 32 can be offset with respect to ground which is the base against which the sensor 14 operates during transmission and signal processing, as discussed above. The zero reference signal 93 output is applied to capacitor 103 when the sample signal 93 for the zero reference is generated by the timing circuit 88. This zero reference output 93 is applied through the zero set control loop 110 so that the zero reference signal 93 value is subtracted from the composite signal 94 prior to the composite signal 94 being input to the demultiplexer 46, and distributed through the pressure and temperature channels. The zero reference signal 93 is subtracted from the total composite incoming signal 94, and specifically from the pressure and temperature portion of the composite signal 94 to obtain a differential value which provides the absolute information of temperature and pressure of air in a pneumatic tire. In other words, the composite signal 94 is shifted based on the zero reference portion of the signal, such that the zero reference signal 93 level is assured to be placed at ground level, and resulting differential values for the pressure and temperature portions of the signal are made valuable.

An example of the phase locked loop timing circuit 88 is shown in FIG. 7. The circuit comprises a D flip-flop 112 which receives the signal generated from the comparator 82 after it passes through a low pass filter 85. The filter 85 prevents the phase locked loop device 114 from triggering to noise. The D flip-flop 112 applies two signals to the phase locked loop device 114, which are utilized by the phase locked loop device 114 to generate a voltage control oscillator output having eight times the frequency of the output signal of comparator 82. The wave form of the output signal of the D flip-flop 112 can be seen in FIG. 6c and the wave form oscillator output of the phase locked loop device 114 can be seen in FIG. 6d. The voltage controlled oscillator output of the phase locked loop device 114 is applied to a decade counter 116, which is a divide by eight counter, which provides the sampling signals 90-93 from the zero, two, four and six count terminals. The eight count terminal of the decade counter 116 is used to reset the counter 116. The D flip-flop 112 may for instance be integrated circuit CD4013, the phase locked loop device 114 may be an integrated circuit CD4046 and the decade counter 116 may be an integrated circuit CD4017, all of which are generally available from a number of manufacturers such as National Semiconductor Company, Inc.

The zero set control loop 110 may have a circuit as shown in FIG. 5, which consists basically of an amplifier 118, such as a type LT1014 as is generally available. The resistance and capacitor values are as follows:

| R15 | 100K OHMS |
|---|---|
| R16 | 100K OHMS, |
| Capacitor | 1 uf. |

The demultiplexer 46 may be an integrated circuit type CD4016 as is generally known and manufactured by a number of manufacturers such as the National Semiconductor Company, Inc., which would be connected as follows:

| Signal | Pin |
|---|---|
| Composite | 11, 8, 4, 2 |
| Pressure Sampling | 5 |
| Temperature Sampling | 13 |
| Zero Reference | 6 |
| Reference | 12 |
| +5 volts | 15 |
| −5 volts | 7 |
| Reference output | 10 |
| Zero Reference Output | 9 |
| Pressure Output | 3 |
| Temperature Output | 1 |

The comparator 82 may be configured from operational amps type LF353, as are also generally available. The gain amps 104, 106 and 108 are amplifier types LT1014, also generally available. The resistor values for the circuit shown in FIG. 5 are preferably as follows:

| R7 | 50k ohms |
|---|---|
| R8 | 50k ohms |
| R9 | 1M ohms |
| R10 | 270k ohms |
| R11 | 100k ohms |
| R12 | 100k ohms |
| R13 | 100k ohms |
| R14 | 100k ohms |
| R17 | 100k ohms |
| R18 | 100k ohms |
| R19 | 100k ohms |
| R20 | 100k ohms |

The negative peak detector 89 has two diodes 112, 124 and an operational amplifier 109 as well as a capacitor 110 of a preferred value of 1 uF. The various resistor values for this circuit shown in FIG. 8 are preferably as follows:

| R21 | 1k ohms |
|---|---|
| R22 | 1k ohms |
| R23 | 1M ohms |
| R24 | 2k ohms |

It should be understood that the present invention was described in connection with one specific embodiment. Modifications will become apparent to one skilled in the art upon a study of the specification, drawings and the claims. Other designs and hardware could be used to obtain tire pressure and/or temperature for controlling a vehicle suspension system.

What is claimed is:

1. A method for adjusting the ride characteristics of a suspension system in response to the temperature and pressure of air in a pneumatic tire, said method comprising the steps of:
    generating a first signal in response to the pressure of air in said pneumatic tire;
    generating a second signal in response to the temperature of air in said pneumatic tire;
    multiplexing said first and second signals to produce a multiplexed signal;
    transmitting said multiplexed signal;
    receiving said multiplexed signals;
    demultiplexing said multiplexed signals after said multiplexed signals have been received, said step of demultiplexing operable to generate a demultiplexed signal; and
    adjusting the ride characteristics of said suspension system in response to said demultiplexed signal.

2. The method of claim 1, wherein said step of generating a first signal comprises the step of changing the resistance of a Wheatstone in response to the pressure of air in said pneumatic tire.

3. The method of claim 1, wherein said step of generating a second signal comprises the step of changing the resistance of a temperature resistor in response to the temperature of air in said pneumatic tire.

4. The method of claim 1, wherein said step of multiplexing said first and second signals comprises the step of multiplexing a reference signal with said first and second signals.

5. The method of claim 4, wherein said step of demultiplexing said multiplexed signal comprises the step of identifying said reference signal by a reference signal detector.

6. The method of claim 5, wherein said step of demultiplexing further comprises the step of using said reference signal to demultiplex said multiplexed signal.

* * * * *